United States Patent Office 3,502,105
Patented Mar. 24, 1970

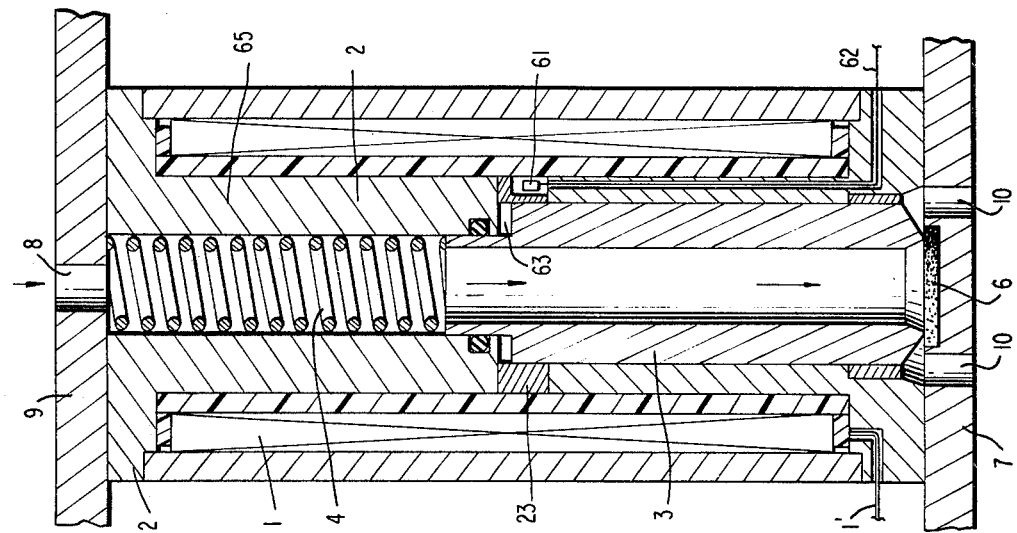
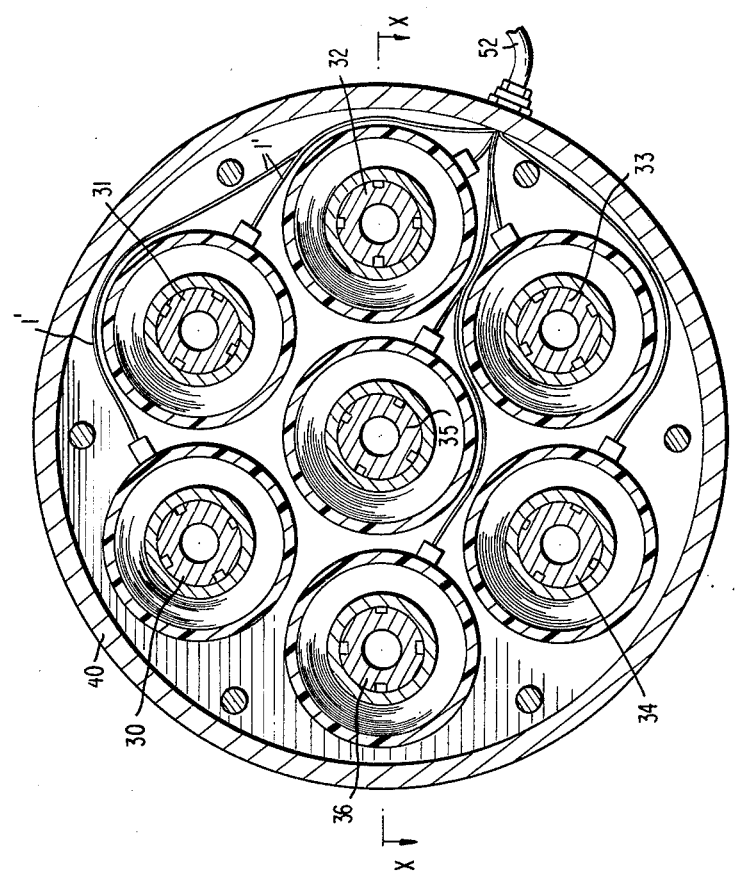
FIG. 4
FIG. 3

3,502,105
ELECTROMAGNETIC VALVES AND APPLICATION THEREOF TO DIGITAL VALVES
Herbert Ernyei and Jean Saive, Paris, France, assignors to Societe Lignes Telegraphiques et Telephoniques, Paris, France, a joint-stock company of France
Filed July 14, 1967, Ser. No. 653,455
Claims priority, application France, July 27, 1966, 71,012
Int. Cl. F16k *11/20*
U.S. Cl. 137—599        2 Claims

ABSTRACT OF THE DISCLOSURE

The electromagnetic valves of the present invention consist substantially of an electromagnet in the form of a hollow cylinder through which the fluid passes, the movable core of the said valve playing the role of valve stem, and of valve per se. The said core moves with reference to the fixed magnetic circuit of the coil, sliding in a toric joint seal. The end of the core constituting the valve cooperates with a fixed elastic seat which is used likewise as a joint seal of the closed valve. Ancillary arrangements provided in the magnetic structure allow:

(1) the static balancing of the core constituting the valve in such a way as to reduce the current that energizes or commands each valve;
(2) indication of the position of the core;
(3) holding of the core in its position of the moment, in case of interruption of the energizing current from the coil.

A digital valve of the present invention presents an enclosed assembly of unit valves of the above characteristics.

Background of invention

The present invention relates to a fully open or fully closed electromagnetic valve with fixed flow, of structure as simple as possible, and to the application of such valves to the construction of digital valves. A digital valve is a regular valve whose flow is automatically adjusted in response to a digital command signal, more especially to a signal in binary code. The said structure plays simultaneously the role of a digital-analog converter and of an actuator in a chain of automatic command.

The present invention is an improvement over the valves of my copending application Ser. No. 385,241 filed July 27, 1964, now U.S. Patent No. 3,331,393.

The embodiment which is the subject of the present application consists in a system of balanced double seat valves mounted in a single body which allows summing of the flows of the unit valves. For a given valve diameter the flow of a unit valve is adjusted by a skirt profile mounted on the valve stem. In the example described, the flows constitute a geometric progression of ½. The command of each valve is effected by a coil external to the general body of the digital valve.

The valves of the present invention, with reference to the embodiments that are the subject of the invention mentioned above, offer a very significant reduction of bulk as well as of cost of manufacture. They also constitute apparatus whose ease of control and whose reliability are substantially greater than those of the prior art.

Brief summary of invention

The electromagnetic valves of the present invention comprise substantially an electromagnet in the form of a hollow cylinder through which the fluid passes. The movable core acts as valve stem and as valve per se. The said core moves with reference to the fixed magnetic circuit of the coil, sliding in a toric joint seal. The end of the core which constitutes the valve per se cooperates with a fixed elastic seat which is also used as a joint seal for the closed valve. Ancillary arrangements provided in the magnetic structure allow:

(1) Static balancing of the core that comprises the valve in such a way as to reduce the energizing or command current of each valve;
(2) Indication of the position of the core;
(3) Holding the core in its energized position in case of interruption of the energizing current of the coil.

The said valves are fixed, the flow being solely defined by the diameter of the central opening of the electromagnet.

In a preferred modification, each valve is associated with an inlet plate at the valve input, the said plate presenting a calibrated opening that defines the flow through the valve.

The simplicity of this structure makes it especially reliable and sturdy. The only movable piece is the hollow core of the electromagnet and the only zone of friction is that of the dynamic joint which can be made of a material that is suited to the liquid in question, to reduce wear to a negligible level. Wear of the static joint is also slight.

A digital valve of the present invention comprises a system of unit valves of the above described character, mounted in a single body which has a single entrance recess, one wall of which is closed by a plate presenting calibrated openings that define the flow of each unit valve, and a single outlet recess that ensures the summing of the flows, one external wall of the said recess presenting seats that cooperate with the movable parts of the valves as well as discharge apertures for the fluid. The plate of the inlet recess is interchangeable, which allows modification of the flow factor of the digital valve. It is the sole element serving to determine the maximum flow of the digital valve. In the case of embodiments intended for operation at low differential pressure, it is often possible to use identical unit valves, the upper limit of the maximum flow being fixed by the unit valve itself. In embodiments intended for operation at differential pressures greater than about 5 bars for a valve of an inch nominal diameter, it becomes necessary to use unit valves of different types, since the EMF that is exerted is no longer sufficient for unit valves associated with high values of unit flow. In any case, experiments carried out with digital valves comprising 7 unit valves have shown that in the most unfavorable cases the problems presented in their industrial utilization can be resolved by combinations that comprise not more than three different types of unit valves. No piece that constitutes the unit valves requires precision machining.

Brief description of drawings

FIGS. 2 and 3, in axial section and in top view, show an embodiment of a digital valve of the present invention;

FIG. 4 is a schematic section of a modification of the embodiment of FIG. 1.

Detailed description of drawings

Figure 1:
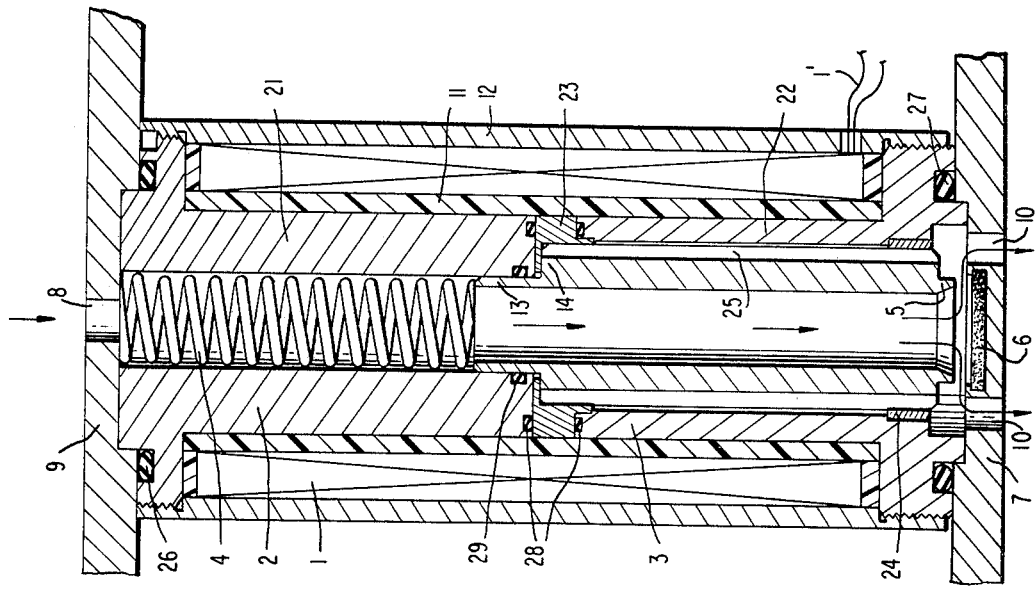
FIG. 1 is a section of a unit valve of the present invention.

FIG. 1 shows in section one embodiment of a simple electromagnetic valve of the invention, in open position, i.e. in the situation in which an energizing current is passing through coil 1, supplied at 1'. The magnetic induction that is established in magnetic structure 2 pulls hollow cylindrical magnetic core 3 upward, the said core normally being thrust downward by the force exerted by spring 4. Core 3 ends in a flange 5 whose edge is rounded so that it is applied compressingly to an elastic joint 6 resting in a seat of a fixed terminal plate 7. Admission of the fluid occurs through calibrated opening 8 of a fixed upper plate 9 which like plate 7 can serve as connection and fixing element for the valve. The fluid passes through opening 8, spring 4, and hollow movable core 3 and issues through openings 10 in plate 7 at the periphery of joint 6, as indicated by the arrows. Coil 1 has a spindle 11 and a jacket 12. Its manufacture is well known to those familiar with the art. The movable part of the valve is limited to core 3 which is made of a relatively hard magnetic material, e.g. chromium stainless steel. It presents an upper part 13 of reduced cross section whose upper end serves as a bearing surface for spring 4. Shoulder 14 which abuts against the magnetic structure fixes the end of the stroke of the movable part in the open position of the valve.

Magnetic structure 2 comprises an upper cylindrical sleeve 21 and a lower sleeve 22 joined by a collar 23 made of nonmagnetic material (brass) which defines the air gap where the EMG is established. Said force is exerted on shoulder 14 of the core whose section is suitably dimensioned. The force must overcome the downward directed resultant of the forces exerted on the core. It is advantageous that the said resultant be slight and just enough to ensure a seal between core 3 and elastic joint 6, as well as the dynamic forces exerted on the core by the circulating fluid. In this way, the magnetomotive force necessary to open the valve is minimal, which allows reduction of the external diameter of the core and the number of ampere turns of the coil, hence a reduction of electric power consumption on the part of the valve.

The presence of a flange at the lower end of the core allows a reduction of the resultant, or in other words a static balancing of forces. If the forces exerted on the core by the fluid (when the valve is closed) are considered, it is observed that the resultant of static forces is zero, by reason of symmetry, on the cylindrical part of the internal face of the core and that it is presented on the conical part of the flange as a vertical force directed upward from below, i.e. tending to open the valve, and counterbalanced by a force acting downward from above on the upper part 13 of core 3 by virtue of packing 29 which separates the upstream pressure from the downstream pressure.

The surface thus presented to the difference of pressures, corresponding to the section of the upper part 13 of core 3, is made equal to the projection of the flange surface in the same plane, so that the static vertical forces acting on the core and directed respectively upward and downward compensate each other.

In order to avoid any risk of sticking of the magnetic core 3 on the fixed magnetic structure, lower part 22, in a well known arrangement, presents a seat filled by a ring 24 of non-magnetic material. Core 3 has longitudinal grooves such as 25 for equalizing the pressure in the course of its movement.

The seal between the upper connecting element 9 and the valve per se is effected by a toric seal 26, joint 27 ensuring this function with reference to discharge connection in the plate 7. At 28 seals are drawn between the two parts of the magnetic structure and ring 23, which defines the air gap. These joints are fixed, and their manufacture presents no problem. Joint 29 which effects the seal between fixed magnetic sleeve 21 and movable core 3 is a dynamic joint which is subjected to stress when the core moves. In a special embodiment, the movable part is of stainless steel, the fixed magnetic structure is of semi-hard XC 35F steel, and joint 29 is of Perbunan, neoprene, viton, etc., depending upon the liquid that is being transmited. The seal of the closed valve is effected by the compression of fixed joint 6 by the lower end of core 3. A dynamic joint made of Perbunan presents the necessary elasticity and a sufficient resistance to tolerate several thousands of operations of the valve without wear.

If the valve is to operate at a temperature about 100° C., it is preferable to make the various joints of Teflon.

In order to make utilization of this kind of valve more flexible, it is provided as an auxiliary feature of the invention that the valve flow may be defined not by the diameter of the internal passage of the valve (defined by sleeve 21 and the single central opening of core 3), but rather by the calibrated opening 8 provided in the upper connecting element 9. In this way it is possible with a given mechanical structure of the valve to cover a large range of flow by simple exchange of connecting plate 9. The valve illustrated in the figure is closed when there is no current in the coil. It remains open during the period of passage of current in the coil. Its supply circuit is a source controlled by the pulse of the coded command.

Figure 2:
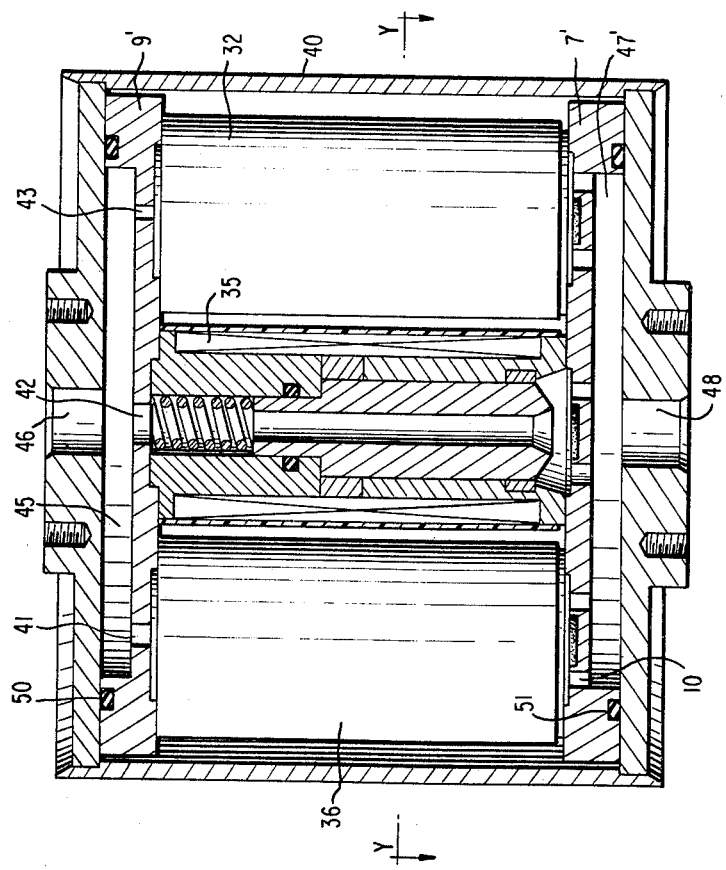

In FIGS. 2 and 3 a digital valve is shown whose unit valves are of the type shown in FIG. 1. To simplify the drawing, the structure of each unit valve, already presented in the earlier figure, is indicated schematically. As shown, the system of unit valves 30, 31, etc. (seven in number) is arranged between two plates, respectively 7' and 9', which serve to fix the assembly in a housing 40 which is made to afford the conditions of safety that are customarily required. Upper plate 9' prevents calibrated openings 41, 42, 43, etc. defining the flows of the unit valves. Its upper part is hollowed by a recess that constitutes an inlet chamber 45 communicating by inlet opening 46 with the fluid supply. A filter can be disposed at this point in the fluid path. Similarly, the discharge plate 7' has a series of holes 10 for evacuation of the fluid that has passed through each of the unit valves. Its central part presents a recess defining a discharge chamber 47'. The fluid issues at 48. In FIG. 2 unit valve 35 is shown in section, alone, in its open position. Unit valves 32 and 36, which are of identical structure, are not illustrated in section. The seal between the housing 40 and plates 7' and 9' is effected by toric joints, respectively, 50 and 51. The calibration of openings 41, 42, 43, etc., in distributor plate 9' is adjusted as a function of the command code, so as to ensure necessary analog flow values. As already explained in French Patent No. 1,385,-407, filed Sept. 13, 1963, by the applicant, for "Improved Digital Valve Structure," when the command signal is binary, the flow values of the unit valves constitute a geometric progression of ½; the unit valve with maximum flow has a flow equal to half the maximum value of the digital valve. At 52 there is shown the command line for the digital valve comprising all of the conductors 1' for the unit valves. To simplify the drawing, a single conductor is drawn per unit valve, though of course the energizing of a coil requires two.

FIG. 4 shows, in closed position, a modification of the unit valve, the representation being simplified so that the differences with reference to the embodiment of FIG. 1 are clear. It is understood that identical elements have the same reference numbers in both figures. As before, the arrow indicates the path of flow of the fluid.

The modification has an electromagnetic device for indication of the effective position of movable core 3 and magnetic means to hold the valve in the position it occupies if the energizing current of the coil ceases, no matter what the position. The indication of the position of movable core 3 of the valve is obtained by installation in the magnetic structure, near non-magnetic ring 23, of a relay with magnetic blade 61 which is responsive to the magnetic field established at this point in the structure. At 62 there are shown wires associated with the contact of relay 61. According to the position of the blade inside the relay, lines 62 are interconnected or not. When movable core 3 is in its lower position there is a gap between the upper part 21 of the magnetic structure and core 3. This gap 63 causes the magnetic field to spread out in its vicinity. Consequently the relay with magnetic blade 61 is subjected to a more intense magnetic field than there would be without this gap. When core 3 is in its upper position (open valve) the continuity of the magnetic circuit is assured by the contact between core 3 and the upper part 21 of the magnetic structure, and the field is concentrated in core 3. The relay is exposed only to a leakage field that corresponds to a value sufficiently low to open the contact. The relay can thus indicate the position of core 3 with reference to ring 23.

According to another modification of the invention, there is associated with the magnetic structure as shown in FIG. 1 an outer concentric cylindrical sleeve 65 made of hard magnetic material, i.e. of the type from which permanent magnets are made, replacing jacket 12 of the former embodiment. The said magnet is designed to establish a magnetic field perpendicular to gap 23, in the same direction as the field of coil 1. The value of the said field is insufficient to draw core 3 upward, but it will hold it in position when the valve is open. The applicant has found that a permanent field whose intensity is equal to half the field necessary for opening the valve will ensure optimal operation. Such a valve can be directly commanded by a pulsed signal of the type constituting the binary command signal on condition that it be presented in the form of pulses of opposite sign to represent the two possible values "0" or "1" of the signal. When the field established by coil 1 is added to the permanent field, the valve opens and the core is drawn upward. At the end of the pulse, the valve remains open under the effect of the holding permanent field. When the direction of the current is reversed, the magnetic field created by the coil is opposed to the permanent field and compensates it. Urged by spring 4, the core is thrust downward and the valve closes. After the pulse disappears, the valve remains closed since the permanent field is not strong enough to open it.

The embodiment of FIG. 1 is of the "normally closed" type, i.e. the valve is closed when there is no current passing through the coil. But of course it is also possible within the scope of the invention to make "normally open" valves, i.e. with reverse operation.

One particular embodiment of the digital valve of the present invention is characterized as follows:

Nominal diameter—one inch
Diameter—270 mm.
Distance between straps—250 mm.
Weight—40 kg.
Current consumption (at 20° C.)—270 watts (less than 220 v. rectified)
Position of mounting—as required output factor (CU)—10 m.³/h. (differential pressure 1 bar)
Maximum differential pressure—10 bars
Power of resolution—0.8%
Utilization ratio—127 (leakage negligible in comparison to minimum flow)
Response time—0.5 sec.
7 identical unit valves
Force of spring 4—4.5 kg.
Number amp-turns—2500

We claim:
1. A digitally controlled electromagnetic valve assembly comprising in combination:
a closed housing having a fluid inlet and a fluid outlet;
a plurality of electromagnetically operated valves within said housing, each valve including a fluid inlet and a fluid outlet communicating with said inlet and outlet of said housing;
each of said plurality of valves including:
two annular magnetic sleeves in axial alignment and coaxially positioned with respect to said valve inlet and outlet;
a non-magnetic annular member positioned between adjacent ends of said annular sleeves;
a hollow magnetic valve member movable between valve open and valve closed positions, concentrically disposed within one of said annular sleeves and including a portion forming a fluid tight sliding seal with the other of said sleeves, spring means normally biasing said valve member toward valve closed position;
a coil surrounding said annular sleeves and operative when energized to move said valve member to valve open position;
a plate member within said housing and spaced inwardly from said housing fluid inlet and overlying said fluid inlet of each of said valves, said plate having a series of different size apertures therethrough and aligned with each valve fluid inlet respectively;
and means affording connection of said coils to a source of digital pulses for operating said valves in accordance with a predetermined code.

2. The combination defined by claim 1 in which said non-magnetic annular member has an open chamber therein and a movable magnetic relay means housed in said chamber and responsive to the presence of magnetic flux when said coil is energized, and means affording connection of indicator means to said relay for indicating when said valve is open or closed.

References Cited

UNITED STATES PATENTS

| | | | |
|---|---|---|---|
| 3,072,146 | 1/1963 | Gizeski | 137—599 XR |
| 3,164,065 | 1/1965 | Frantz. | |
| 3,178,151 | 4/1965 | Caldwell | 251—139 XR |
| 3,321,177 | 5/1967 | Fendel et al. | 251—139 XR |

ROBERT G. NILSON, Primary Examiner

U.S. Cl. X.R.

137—554; 251—65, 139